United States Patent
Yoshida et al.

(10) Patent No.: US 6,388,044 B1
(45) Date of Patent: May 14, 2002

(54) POLYETHER RESIN AND COATING SOLUTION FOR FORMING INSULATION FILM

(75) Inventors: Yuji Yoshida, Tokyo; Akira Yokota, Tsukuba; Sadanobu Iwase, Tsuchiura; Hyuncheol Choi, Tsukuba, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/657,062

(22) Filed: Sep. 7, 2000

(30) Foreign Application Priority Data

Sep. 9, 1999 (JP) .......................... 11-255536
Nov. 24, 1999 (JP) .......................... 11-332765

(51) Int. Cl.$^7$ .............................................. C08G 65/40
(52) U.S. Cl. ................. 528/106; 528/116; 528/118; 528/119; 528/196; 528/211; 528/397
(58) Field of Search ................. 528/106, 116, 528/118, 119, 196, 211, 397, 425

(56) References Cited

U.S. PATENT DOCUMENTS 5,153,306 A * 10/1992 Matsuo et al. ............... 528/206
5,258,485 A * 11/1993 Matsuo et al. ............... 528/206

OTHER PUBLICATIONS

Suzuki et al., Thermally stable and low moisture absorption quinolinediyl group containing polymer compositions and their uses in electric insulation and adhesive films, Dec. 1998, Chem. Abstract 130: 111033.*

* cited by examiner

*Primary Examiner*—Duc Truong
(74) *Attorney, Agent, or Firm*—Birch, Stewart, Kolasch & Birch, LLP

(57) ABSTRACT

The present invention provides a thermosetting polyether resin obtained by polycondensing a dihalogen compound with a bisphenol compound to obtain a polyether resin having a repeating unit represented by the formula (1), and introducing a functional group which causes a cross-linking reaction by heating into the resulted polyether resin;

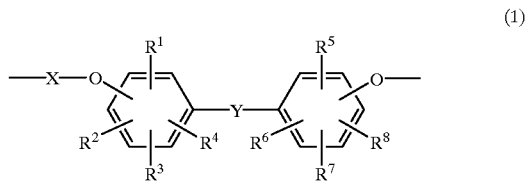

The present invention also provides a polyether resin having a low dielectric constant represented by the formula (3):

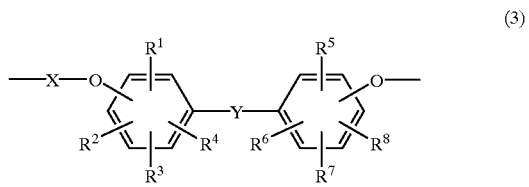

8 Claims, No Drawings

POLYETHER RESIN AND COATING SOLUTION FOR FORMING INSULATION FILM

FIELD OF THE INVENTION

The present invention relates to a thermosetting polyether resin and a polyether resin having low dielectric constant.

More particularly, the present invention relates to a thermosetting polyether resin used for insulation and coating in various electronic devices, a polyether resin having low dielectric constant used for insulation and coating of hypervelocity computing devices (MPU), a process for producing the same, and a coating solution for forming an insulation film containing said resin.

Further particularly, the present invention relates to a thermosetting polyether resin having low dielectric constant property, high heat resistance, chemical resistance and high film strength, a process for producing the same, and a coating solution for forming an insulation film containing said thermosetting polyether resin.

BACKGROUND OF THE INVENTION

High speed performance of LSI is attained by reduction in size of transistors constituting the LSI. Recently, the wiring distance has decreased by this reduction in size, and the signal propagation delay (wiring delay) and the crosstalk noise between adjacent wirings have become remarkable, providing important problems preventing the high performance of LSI itself. For solving these problems, lowering of the relative dielectric constant of an insulation film burying spaces between wirings is in investigation. Though a SOG (Spin on Glass) film conventionally used as an insulation film is an effective material since an insulation film can be formed easily on a device substrate by coating and baking, the dielectric constant thereof is from 3.0 to 3.9, being not sufficiently lower. When the distance between wirings is 0.25 μm or lower, an insulation film having a relative dielectric constant preferably less than 3.0 is required.

Use of a polyether resin for forming an insulation film is known. For example, Japanese Patent Application Laid-Open (JP-A) No. 9-246429 discloses an example using, as an insulation material, a polyphenylene ether resin obtained by oxidation polymerization. However, a polyether-based resin obtained by an oxidation polymerization is not admitted as satisfactory in the solubility into a solvent. For example, JP-A Nos. 9-202823 and 9-202824 disclose an application example of a polyether-based resin to a material having lower dielectric constant using a Ullmann's reaction.

Multilevel interconnect for high speed LSI needs low dielectric constant materials for inter-level layer dielectrics. Moreover, in the production process, the chemical resistance and mechanical strength of the insulation film are extremely important for inter-level dielectrics. Particularly when an insulation film is coated and sintered before patterning thereon by lithography, a process for contact with a developer (alkali aqueous solution, organic solvent) and a process for contact with a resist stripper containing an organic amine in releasing a resist are present, therefore, it is essential that the insulation film can endure these chemicals. Further, due to physical operations such as Chemical Mechanical Polishing (CMP) and the like, the insulation film is required to have certain mechanical strength, and strict adhesion is required to a material to be coated on which the insulation film is formed. However, when a known polyether-based resin for forming an insulation film, for example, a polyether polymer obtained by the above-mentioned Ullmann's reaction, is used, insufficient chemical resistance or film strength is problematical and improvement thereof is required.

SUMMARY OF THE INVENTION

The object of the present invention is to provide a thermosetting polyether resin which can be used as an inter-layer insulation material which has excellent chemical resistance and film strength, or a polyether resin having a low dielectric constant having a low relative dielectric constant which can be applied to a hypervelocity computing device, a method for producing the same, and a coating solution which forms an insulation film having a low electric constant, and excellent in chemical resistance and film strength.

The present inventors have investigated various resins, and resultantly, found that a polyether having a specific structure shows excellent relative dielectric constant as an inter-layer insulation material and chemical resistance and film strength can be manifested by further introduction of a specific functional group, and have completed the present invention.

Namely, the present invention relates to [I] a thermosetting polyether resin obtained by polycondensing a dihalogen compound with a bisphenol compound to obtain a polyether resin having a repeating unit represented by the formula (1), and introducing a functional group which causes a crosslinking reaction by heating into the resulted polyether resin;

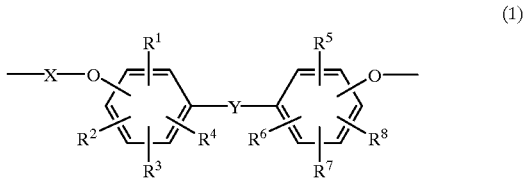

(1)

wherein each of $R^1$ to $R^8$ is independently selected from the group consisting of hydrogen atom, fluorine atom, chlorine atom, bromine atom, iodine atom, an alkyl group having 1 to 10 carbon atoms which may be substituted, a cycloalkyl group having 4 to 10 carbon atoms which may be substituted, a $OR^9$ group, a phenyl group which may be substituted; $R^9$ is selected from the group consisting of hydrogen atom, an alkyl group having 1 to 10 carbon atoms which may be substituted, a cycloalkyl group having 4 to 10 carbon atoms which may be substituted, and a phenyl group which may be substituted; X is selected from any one or more groups described below; Y is selected from a single bond, a hydrocarbon group having 1 to 20 carbon atoms, or any one or more of —O—, —CO— and —$SO_2$—;

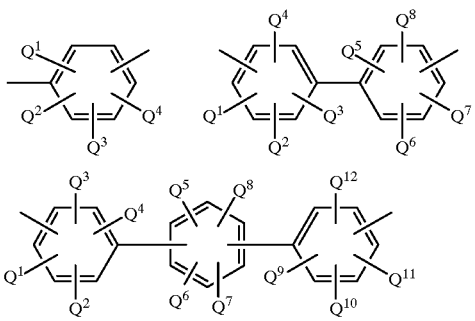

-continued

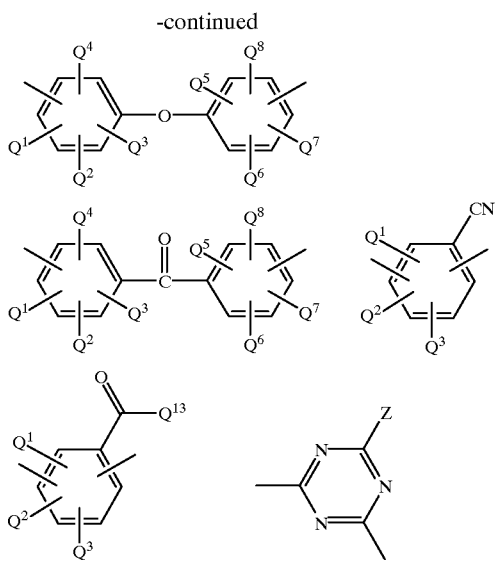

each of $Q^1$ to $Q^{12}$ is independently selected from the group consisting of an alkyl group having 1 to 10 carbon atoms which may be substituted, a cycloalkyl group having 4 to 10 carbon atoms which may be substituted and a phenyl group which may be substituted; m represents an integer from 0 to 4; n represents an integer from 0 to 3; Z is selected from the group consisting of hydrogen atom, fluorine atom, chlorine atom, bromine atom, iodine atom, a —$OZ^1$ group, and a —$N(Z^2)(Z^3)$ group; each of $Z^1$ to $Z^3$ independently selected from the group consisting of hydrogen atom, an alkyl group having 1 to 10 carbon atoms, an alkenyl group having 2 to 10 carbon atoms, an alkynyl group having 2 to 10 carbon atoms, and a group carrying an ether group having 1 to 10 carbon atoms.

The present invention relates to [II] a polyether resin having a low dielectric constant represented by the formula (3):

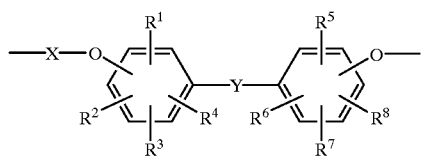

(3)

wherein, $R^1$ to $R^8$ and $Q^1$ to $Q^{12}$ are as defined in the formula (1), however, at least one of $R^1$ to $R^8$ and $Q^1$ to $Q^{12}$ is selected from an alkyl group having 4 to 10 carbon atoms or a cycloalkyl group having 4 to 10 carbon atoms.

Further, the present invention relates to [III] a coating solution for forming an insulation film wherein the solution comprises the above-mentioned thermosetting polyether resin or polyether resin having a low dielectric constant.

DETAILED DESCRIPTION OF THE INVENTION

Then, the present invention will be illustrated in detail.

The polyether resin in the present invention comprises a repeating unit represented by the formula (1) obtained by condensing a dihalide compound represented by the formula (4) with a bisphenol compound represented by the formula (5), and may have two or more of different repeating units represented by the formula (1). In the formula, each of $R^1$ to $R^8$ is independently selected from the group consisting of hydrogen atom, fluorine atom, chlorine atom, bromine atom, iodine atom, an alkyl group having 1 to 10 carbon atoms which may be substituted, a cycloalkyl group having 4 to 10 carbon atoms which may be substituted, a $OR^9$ group, and a phenyl group which may be substituted. $R^9$ is selected from the group consisting of hydrogen atom, an alkyl group having 1 to 10 carbon atoms which may be substituted, a cycloalkyl group having 4 to 10 carbon atoms which may be substituted, and a phenyl group which may be substituted,

(4)

wherein, X is as defined in the formula (1). A represents any of fluorine atom, chlorine atom, bromine atom, iodine atom,

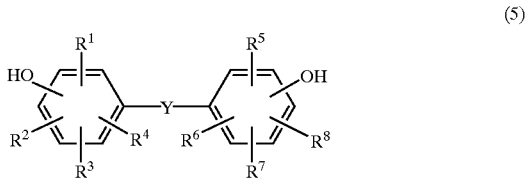

(5)

wherein, $R^1$ to $R^8$ and Y are as defined in the formula (1).

As the alkyl group having 1 to 10 carbon atoms which may be substituted, branched or linear alkyl groups having 1 to 10 carbon atoms are listed. Examples thereof include hydrocarbon groups such as a methyl group, ethyl group, n-propyl group, iso-propyl group, butyl group, t-butyl group, pentyl group, hexyl group, octyl group, decyl group and the like, and these may appropriately have a substituent. Substituents which can usually introduced into a hydrocarbon group are exemplified as this substituent. Among them, fluorine atom, chlorine atom, hydroxyl group and the like are preferable. Examples of such an alkyl group include a fluoromethyl group, trifluoromethyl group, fluoroethyl group, 1,1,1-trifluoroethyl group, perfluoroethyl group, fluorobutyl group, perfluorobutyl group, fluorohexyl group, perfluorohexyl group, fluorooctyl group, perfluorooctyl group, fluorodecyl group, perfluorodecyl group, chloromethyl group, trichloromethyl group, chloroethyl group, 1,1,1-trichloroethyl group, chlorobutyl group, chlorohexyl group, chlorooctyl group, chlorodecyl group, hydroxymethyl group, hydroxyethyl group, hydroxybutyl group, hydroxyhexyl group, hydroxyoctyl group, hydroxydecyl group and the like, and isomers thereof. The alkyl group having 4 to 10 carbon atoms which may be substituted may also be a group having a single ring structure or a group in which a plurality of rings are bonded by cross-linking. Examples thereof include groups such as a cyclobutyl group, cyclopentyl group, cyclohexyl group, methylcyclohexyl group, dimethylcyclohexyl group, ethylcyclohexyl group, butylcyclohexyl group, cyclooctyl group, methylcyclooctyl group, dimethylcyclooctyl group, ethylcyclooctyl group, bicyclobutyl group, spiropentane group, bicyclo[3.1.0]hexyl group, cubane group, norbornene group and the like, and these may appropriately have a substituent. Substituents which can usually introduced into a hydrocarbon group are exemplified as this substituent. Among them, fluorine atom, chlorine atom, hydroxyl group and the like are preferable. Examples of such a cycloalkyl group include a fluorocyclobutyl group, fluorocyclopentyl group, fluorocyclohexyl group, fluoromethylcyclohexyl group, difluorocyclobutyl group, difluorocyclopentyl group, difluorocyclohexyl group, perfluorocyclobutyl group, perfluorocyclohexyl group, perfluorocyclooctyl group, chlorocyclobutyl group, chlorocyclopentyl group, chlorocyclohexyl group, chloromethylcyclohexyl group, dichlorocyclobutyl group, dichlorocyclopentyl group, dichlorocyclohexyl group, hydroxycyclobutyl group, hydroxycyclopentyl group, hydroxycyclohexyl group, hydroxymethylcyclohexyl group, dihydroxycyclobutyl group, dihydroxycyclopentyl group, dihydroxycyclohexyl group and the like, and isomers thereof. The phenyl group which may be substituted may be an unsubstituted phenyl group or a group to which 1 to 5 substituents from alkyl groups, F atom, Cl atom or hydroxyl group are bonded. Examples thereof include a phenyl group, methylphenyl group, ethylphenyl group, dimethylphenyl group, hexamethylphenyl group, fluorophenyl group, difluorophenyl group, hexafluorophenyl group, fluorotoluyl group, difluorotoluyl group, chlorophenyl group, dichlorophenyl group, hexachlorophenyl group, chlorotoluyl group, dichlorotoluyl group, hydroxyphenyl group, dihydroxyphenyl group, hydroxytoluyl group, dihydroxytoluyl group and the like.

In the formula (1), Y is selected from the group consisting of a single bond, a hydrocarbon group having 1 to 20 carbon atoms, and any one or more of —O—, —CO— and —SO$_2$—.

Examples of the above-mentioned hydrocarbon group having 1 to 20 carbon atoms include, but are not limited to, —CH$_2$—, —CH(CH$_3$)—, —C(CH$_3$)$_2$—, —C(CH$_3$)$_2$—C$_6$H$_4$—C(CH$_3$)$_2$— (including various isomers), —CH=CH—,

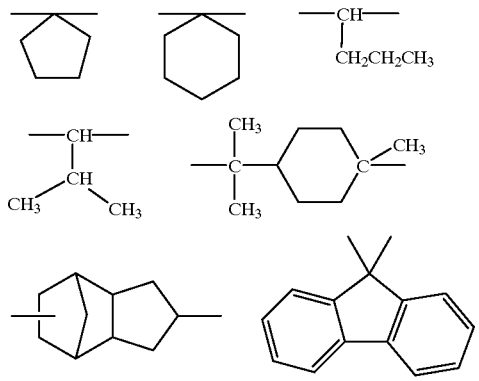

and the like.

Each of Q$^1$ and Q$^{12}$ is independently selected from the group consisting of an alkyl group having 1 to 10 carbon atoms which may be substituted, a cycloalkyl group having 4 to 10 carbon atoms which may be substituted, and a phenyl group which may be substitited. m represents an integer from 0 to 4, n represents an integer from 0 to 3. Z is selected from the group consisting of hydrogen atom, fluorine atom, chlorine atom, bromine atom, iodine atom, a —OZ$^1$ group, and a —N(Z$^2$)(Z$^3$) group. Each of Z$^1$ to Z$^3$ independently selected from the group consisting of hydrogen atom, an alkyl group having 1 to 10 carbon atoms, an alkenyl group having 2 to 10 carbon atoms, an alkynyl group having 2 to 10 carbon atoms, and a group carrying an ether group having 1 to 10 carbon atoms. The alkyl group having 1 to 10 carbon atoms which may be substituted may be branched or linear like in the above-mentioned case, and fluorine atom, chlorine atom, hydroxyl group may be substituted thereon. The cycloalkyl group having 4 to 10 carbon atoms which may be substituted may also be a group having a single ring structure or a group in which a plurality of rings are bonded by cross-linking, like in the above-mentioned case. The phenyl group which may be substituted may be an unsubstituted phenyl group or a group to which 1 to 5 substituents from alkyl groups, flourine atom, cholrine atom or hydroxyl group are bonded, like in the above-mentioned case.

The thermosetting polyether resin of the present invention is obtained by introducing a functional group which causes a cross-linking reaction by heating into the above-mentioned polyether. The heating generally means that a resin is subjected to heating at a temperature of not less than room temperature, and the cross-linking means a reaction in which a chemical bond is formed in a molecule and/or between molecules to form a polymer network structure.

As the functional group which causes a cross-linking reaction by heating, to be introduced into the above-described formula (1), there are exemplified functional groups containing an unsaturated hydrocarbon group such as an allyl group, propenyl group, propargyl group, butenyl group and the like, alkoxysilyl groups such as a trimethoxysilyl group, triethoxysilyl group and the like, a cyanate group, epoxy group and the like. Particularly, an unsaturated hydrocarbon group and a silyl group having an unsaturated hydrocarbon group are preferable since electric property after occurrence of a cross-linking reaction does not deteriorate, due to small electronic polarization property after curing.

Among them, an allyl group, propargyl group and functional groups represented by the formula (2) are preferable as the above-mentioned functional group which causes a cross-linking reaction, from the standpoint of suppression of deterioration in electronic property, (2)

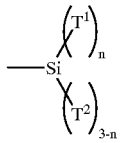

wherein, T$^1$ is selected from the group consisting of an alkenyl group having 2 to 10 carbon atoms and an alkynyl group having 2 to 10 carbon atoms. T$^2$ is selected from the group consisting of an alkyl group having 1 to 10 carbon atoms and an arylene group which may be substituted. n is an integer from 1 to 3. When a plurality of T$^1$ groups are present, they may be the same or different, and also when a plurality of T$^2$ groups are present, they may be the same or different.

A reaction agent used in a reaction for introducing the functional group which causes a cross-linking reaction is obtained by using a halide compound corresponding to the above-mentioned functional group. For example, in the case of introduction of an allyl group, allyl chloride, allyl bromide and allyl iodide are used, in the case of introduction of a propargyl group, propargyl chloride and propargyl bromide are used, and in the case of introduction of a functional group represented by the formula (2), compounds represented by the formula (6) are used, respectively as industrially available raw materials.

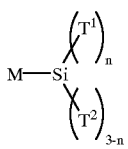

(6)

$T^1$, $T^2$ and n are as defined in the formula (2). M is selected from fluorine atom, chlorine atom, bromine atom or iodine atom.

For introducing the functional group which causes a cross-linking reaction by heating into the above-mentioned polyether resin, there is a method in which a polyether resin is metallized, namely, hydrogen atom bonded to an aromatic ring in the polyether is substituted with a metal, then, substitution reaction is effected using a halide compound containing the functional group which causes a cross-linking reaction. The solvent used in the metallizing reaction is not particularly restricted, and ether, tetrahydrofuran and the like are suitable from the standpoints of the solubility, reactivity and the like of the polyether resin.

The reaction agent used in the metallizing reaction is not particularly restricted, and examples thereof include lithium, sodium, n-butyllithium, sec-butyllithium, tert-butyllithium and the like, and phenyllithium, naphthalenesodium and alkylsodium can also be used. Among them, n-butyllithium available in the form of a n-hexane solution is preferable from the standpoint of workability.

As a polyether resin giving an insulation film having a low relative dielectric constant, a polyether resin having a low dielectric constant represented by the formula (3) is exemplified:

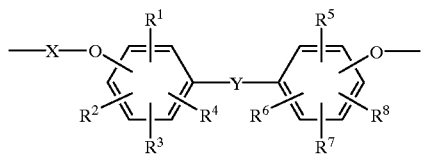

(3)

wherein, $R^1$ to $R^8$ and $Q^1$ to $Q^{12}$ are as defined in the formula (1), however, at least one of $R^1$ to $R^8$ and $Q^1$ to $Q^{12}$ is selected from the group consisting of an alkyl group having 4 to 10 carbon atoms and a cycloalkyl group having 4 to 10 carbon atoms.

In the formula (3), at least one of $R^1$ to $R^8$ and $Q^1$ to $Q^{12}$ is an alkyl group having 4 to 10 carbon atoms or a cycloalkyl group having 4 to 10 carbon atoms. Examples of the alkyl group having 4 to 10 carbon atoms include a n-butyl group, sec-butyl group, t-butyl group, n-pentyl group, iso-pentyl group, sec-pentyl group, n-hexyl group, iso-hexyl group, sec-hexyl group, octyl group and decyl group. Examples of the cycloalkyl group having 4 to 10 carbon atoms include a cyclobutyl group, cyclopentyl group, cyclohexyl group, methylcyclohexyl group, dimethylcyclohexyl group, ethylcyclohexyl group, butylcyclohexyl group, cyclooctyl group, methylcyclooctyl group, dimethylcyclooctyl group, ethylcyclooctyl group, bicyclobutyl group, spiropentane group, bicyclo[3.1.0]hexyl group, cubane group, norbornene group and the like.

Further, a polyether resin in which at least one of $R^1$ to $R^8$ and $Q^1$ to $Q^{12}$ is an alkyl group having 4 to 10 carbon atoms or a cycloalkyl group having 4 to 10 carbon atoms are preferable since such a resin reveals a lowered relative dielectric constant. Examples of the alkyl group having 4 to 10 carbon atoms include a sec-butyl group, t-butyl group, iso-pentyl group, sec-pentyl group, iso-hexyl group, sec-hexyl group and the like. The cycloalkyl group having 4 to 10 carbons is as described above.

Further, a t-butyl group, cyclopentyl group and cyclohexyl group are preferably used since they can easily be introduced into an aromatic ring by using isobutylene, t-butyl chloride, cyclopentene, chlorocyclopentene, cyclohexene, chlorocyclohexane and the like which are industrially easily available raw materials.

A bisphenol monomer having an alkyl group having 4 to 10 carbon atoms or a cycloalkyl group having 4 to 10 carbon atoms as $R^1$ to $R^8$ can be used more preferably since such as monomer is available industrially. Examples of the available monomer include bis(t-butyl)biphenol, biscyclohexylbiphenol, tetra(t-butyl)biphenol, bis(t-butylhydroxyphenyl)isopropylidene, bis(cyclohexylhydroxyphenyl)isopropylidene, bis(t-butylhydroxyphenyl)cycloheptylidene, bis(cyclohexylhydroxyphenyl)cycloheptylidene, bis(t-butylhydroxyphenyl)cyclohexylidene, bis(cyclohexylhydroxyphenyl)cyclohexylidene, bis(t-butylhydroxyphenyl)fluorene, bis(cyclohexylhydroxyphenyl)fluorene and the like.

Further, by introducing the above-mentioned functional group which causes a cross-linking reaction by heating into a polyether resin having a low dielectric constant represented by the formula (3), a polyether resin having a low dielectric constant and having not only a low dielectric constant but also excellent mechanical strength and chemical resistance can be obtained.

A polyether resin represented by the formula (1) or (3) can be usually produced by condensation in the presence of an alkali substance. The alkali substance used is not particularly restricted, and examples thereof include sodium hydroxide, potassium hydroxide, sodium carbonate, potassium carbonate and the like. These can be used in the form of solid, or aqueous solution or the like.

When the reactivity of the dihalide compound is low, a catalyst can be used in addition to the alkali substance, if necessary. Specifically, copper, copper chloride (I) or complex salts thereof are listed.

The thermosetting polyether resin or polyether resin having a low dielectric constant is treated by processes such as filtration, washing with a solution dissolved in a water-insoluble solvent, and the like, for removal of inorganic substance such as metals, salt substance and the like, and is provided in the form of an insulation film-forming coating solution dissolved in an organic solvent. Examples of the solvent include alcohols such as methanol, ethanol, isopropyl alcohol, 2-methoxyethanol and the like, esters such as ethyl acetate, n-butyl acetate, isobutyl acetate, propylene glycol monomethyl ether acetate and the like, ketones such as 2-pentanone, 2-heptanone, acetylacetone and the like, ethers such as diethyl ether, dibutyl ether and the like, phenol ethers such as anisole, phenetole and the like.

When a polyether or a thermosetting polyether is dissolved in an organic solvent, the concentration is controlled usually from 5 to 40 wt %, more preferably from 10 to 20 wt %. When the concentration is lower than this range, the film thickness in spin coat may become too thin, requiring repeated coating for obtaining given film thickness. When the concentration is higher than this range, the viscosity may increase, leading to complicated liquid feeding in coating and the like.

The coating solution for forming an insulation film of the present invention comprises the above-mentioned thermosetting polyether resin or polyether resin having a low dielectric constant, and additives such as a surfactant, antioxidant and the like can also be used in the range wherein chemical resistance and film strength dot not deteriorate. Further, a catalyst such as a peroxide or azo compound or the like can also be added for reducing the curing temperature of a thermosetting group having an unsaturated group in the thermosetting polyether resin. Also, a silane coupling can be used together to further improve adhesion. Moreover, mechanical strength can also be improved by compounding a cross-linking agent to the polyether resin having a low dielectric constant.

The coating solution for forming an insulation film of the present invention can be applied on a substrate of a semiconductor device by a spin coat method or dipping method, and cured by a method such as heat treatment, irradiation and the like, to form an insulation film having a low dielectric constant.

EXAMPLE

The following examples further illustrate the present invention further in detail, but dot not limit the scope of the present invention.

Synthesis Example 1

Into a 500 mL four-necked flask was charged 25.1 g (0.10 mol) of 4,4'-dichlorobenzophenone, 35.3 g (0.09 mol) of 1,1-bis(4-hydroxy-3-cyclohexylphenyl)cyclohexylidene, 2.7 g (0.02 mol) of o-allylphenyl, 41.5 g (0.30 mol) of potassium carbonate, 300 g of dimethyl sulfdxide, and 60 g of toluene, and the mixture was heated. After dehydration by azeotropy of toluene with water, the mixture was kept at 170° C. while stirring for 6 hours under nitrogen flow. After completion of the reaction, the reaction mass was charged into a mixed solvent of 600 g of methanol and 10 g of acetic acid to deposit a substance having higher molecular weight. Then, the resulted polymer was controlled with propylene glycol monomethyl ether acetate to give a solution having a solid content of 15 wt %. This is called Resin solution A.

Synthesis Example 1

Into a 500 mL four-necked flask was charged 21.6 g (0.05 mol) of 1,1-bis(4-hydroxy-3-cyclohexylphenyl)cyclohexylidene, 0.4 g of sodium hydroxide, 70.0 g of benzophenone and 50.0 g of toluene, and the mixture was dehydrated under reflux. After completion of the dehydration, 15.6 g (0.05 mol) of dibromobipheyl was added. Further, a solution of 0.05 g of cuprous chloride dissolved in 5 g of pyridine was added, and they were reacted for 6 hours at an internal temperature of 200° C. After cooling down to room temperature, a solution prepared by mixing 600 g of methanol with 10 g of acetic acid was added to the reaction solution, to deposit a product. The deposited crystal was filtrated, and washed with a large amount of methanol to obtain a polyether resin. Then, this polymer was controlled with anisole to give a solution having a solid content of 15 wt %. This is called Resin solution B.

Synthesis Example 3

Into a nitrogen-purged 300 ml four-necked flask was charged 4 g of the polyether resin obtained in Synthesis Example 2 as a raw material and 100 ml of THF as a solvent, and the polyether resin was allowed to be dissolved. To this was added 21.5 ml of n-butyllithium (1.6 M n-hexane solution), the mixture was stirred for 1 hour under nitrogen flow, and then, 4.0 g of allyl bromide was added and the mixture was further stirred for about 1 hour. After completion of the reaction, the reaction solution was charged into a mixed solvent of 650 g methanol with 20 g of acetic acid, to deposit a substance having higher molecular weight. After filtration, the polymer was washed with methanol and water, to obtain a product in the form of a white powder. The weight-average molecular weight in terms of polystyrene by GPC was 4000.

Introduction of an allyl group was confirmed by $^1$H NMR, IR measurement. Then, the polymer was controlled with anisole to give a solution having a solid content of 15 wt %. This is called Resin solution C.

Synthesis Example 4

Into a nitrogen-purged 1 L four-necked flask was charged 4 g of the polyether resin obtained in Synthesis Example 2 and 400 ml of tetrahydrofuran as a solvent, and the polyether was allowed to be dissolved. To this was added 230 ml of n-butyllithium (1.5 M n-hexane solution), the mixture was stirred for 1 hour under nitrogen flow, and then, 41.6 g of dimethylvinylsilyl chloride was added and the mixture was further stirred for about 1 hour. After completion of the reaction, the reaction solution was charged into a mixed solvent of 1600 g methanol with 40 g of acetic acid, to deposit a substance having higher molecular weight. After filtration, the polymer was washed with methanol and water, to obtain a product in the form of a white powder. The weight-average molecular weight in terms of polystyrene by GPC was about 7000.

Introduction of a vinyldimethylsilyl group was confirmed by $^1$H NMR, IR measurement. Then, the polymer was controlled with anisole to give a solution having a solid content of 15 wt %. This is called Resin solution D.

Synthesis Example 5

Into a nitrogen-purged 200 ml four-necked flask was charged 4 g of the polyether resin obtained in Synthesis Example 1 and 40 g of THF as a solvent, and the polyether resin was allowed to be dissolved. To this was added 23 ml of n-butyllithium (1.6 M n-hexane solution), the mixture was stirred for 1 hour under nitrogen flow, and then, 4.9 g of trivinylsilyl chloride was added and the mixture was further stirred for about 2 hours. After completion of the reaction, the reaction solution was charged into a mixed solvent of 100 g methanol with 20 g of acetic acid, to deposit a substance having higher molecular weight. After filtration, the polymer was washed with methanol and water, to obtain a product in the form of a white powder Introduction of a trivinyl group was confirmed by $^1$H NMR, IR measurement. Then, the resulted linear aromatic polymer was controlled with anisole to give a solution having a solid content of 15 wt %. This is called Resin solution E.

Examples 1 to 2

Resin solutions A and B obtained in Synthesis Examples 1 to 2 were filtrated through a 0.2 μm filter. This was spin-coated on a 4 inch silicon wafer at a revolution of 2000 rpm, baked for 1 minute at 150° C., then, subjected to heat treatment at 350° C. for 30 minutes under nitrogen atmosphere. The coating property (appearance) of the resulted coated film was investigated by an optical microscope at a magnification of 25. The film thickness was measured by an optical film thickness meter (Nanospec 210, manUfactured by Nanometrics), and the relative dielectric constant was measured by C-V measurement (SSM type 495, manufactured by S.S.M) at aworking frequency of 1 MHz by a mercury probe method.

TABLE 1

| Resin solution | Coating property | Film thickness ($\mu$m) | Relative dielectric constant |
|---|---|---|---|
| A | Excellent | 0.35 | 2.9 |
| B | Excellent | 0.71 | 2.6 |

Examples 3 to 5

Resin solutions C, D and E obtained in Synthesis Examples 3 to 5 were filtrated through a 0.2 $\mu$m filter. This was spin-coated on a 4 inch silicon wafer at a revolution of 2000 rpm, baked for 1 minute at 150° C., then, subjected to heat treatment at 350° C. for 30 minutes under nitrogen atmosphere. The film thickness was measured by an optical film thickness meter (Nanospec 210, manufactured by Nanometrics ), and the relative dielectric constant was measured by C-V measurement (SSM type 495, manufactured by S.S.M) at a working frequency of 1 MHz by a mercury probe method. The mechanical strength of the insulation film was obtained by measuring the adhesion with the silicon wafer by Stud-pulling test (Sebastian type V, manufactured by QuadGroup). Regarding chemical resistance, the sample was immersed in toluene (developer for negative resist), 2.5% tetramethylammonium hydroxide (developer for positive resist), and anisole (resin solution solvent) as resist developers for about 10 minutes, and immersed in ALEG310 (manufactured by Mallinckrodt Baker, Inc.) as a resins releasing solution for about 10 minutes at 70° C., and the appearance thereof was observed by an optical microscope at a magnification of 25. The results are shown in Table 2.

TABLE 2

| | Example 3 | Example 4 | Example 5 |
|---|---|---|---|
| Resin solution | C | D | E |
| Relative dielectric constant (1 MHz) | 2.55 | 2.55 | 2.55 |
| Adhesion | 75 | 75 | 80 |
| Chemical resistance | | | |
| Toluene | No change | No change | No change |
| Tetramethyl-ammonium hydroxide | No change | No change | No change |
| Anisole | No change | No change | No change |
| ALEG310 | No change | No change | No change |

The polyether resin of the present invention has a low dielectric constant, and can be used suitably as an insulation material. Further, the thermosetting polyether resin of the present invention maintains a low dielectric constant, and is excellent in chemical resistance and film strength. A suitable insulation film can be formed and a useful semiconductor apparatus can be obtained by using a coating solution for forming an insulation film containing the above-mentioned polyether resin and the thermosetting polyether resin.

What is claimed is:

1. A thermosetting polyether resin obtained by polycondensing a dihalogen compound with a bisphenol compound to obtain a polyether resin having a repeating unit represented by the formula (1), and introducing a functional group which causes a cross-linking reaction by heating into the resulted polyether resin;

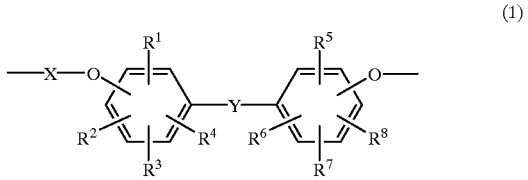

(1)

wherein each of $R^1$ to $R^8$ is independently selected from the group consisting of hydrogen atom, fluorine atom, chlorine atom, bromine atom, iodine atom, an alkyl group having 1 to 10 carbon atoms which may be substituted, a cycloalkyl group having 4 to 10 carbon atoms which may be substituted, a $OR^9$ group, and a phenyl group which may be substituted; $R^9$ is selected from the group consisting of hydrogen atom, an alkyl group having 1 to 10 carbon atoms which may be substituted, a cycloalkyl group having 4 to 10 carbon atoms which may be substituted, and a phenyl group which may be substituted; X is selected from any one or more groups described below; Y is selected from a single bond, a hydrocarbon group having 1 to 20 carbon atoms, or any one or more of —O—, —CO— and —SO$_2$—;

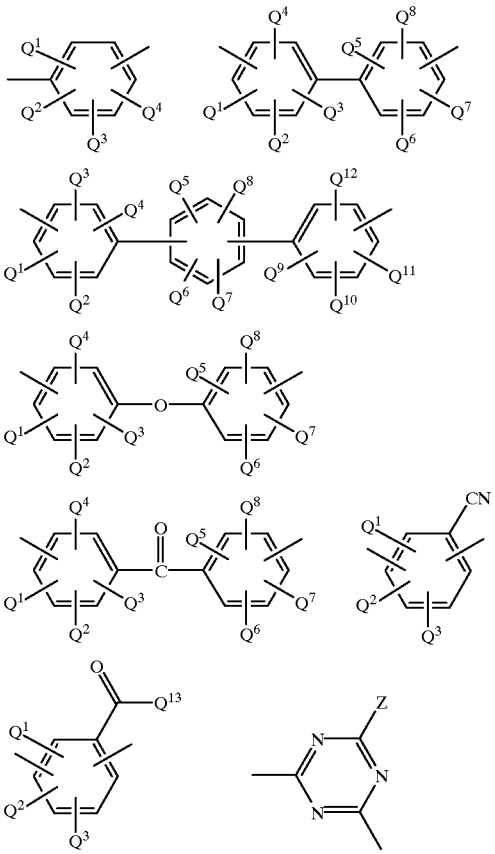

each of $Q^1$ to $Q^{12}$ is independently selected from the group consisting of an alkyl group having 1 to 10 carbon atoms which may be substituted, a cycloalkyl group having 4 to 10 carbon atoms which may be substituted, and a phenyl group which may be substituted; m represents an integer from 0 to 4; n represents an integer from 0 to 3; Z is selected from the group consisting of hydrogen atom, fluorine atom, chlorine atom, bromine atom, iodine atom, a —OZ$^1$ group, and a —N(Z$^2$)(Z$^3$) group; each of Z$^1$ to Z$^3$ independently selected from the group consisting of hydrogen atom, an alkyl group having 1 to 10 carbon atoms, an alkenyl group having 2 to 10 carbon atoms, an alkynyl group having 2 to 10 carbon atoms, and a group carrying an ether group having 1 to 10 carbon atoms.

2. The thermosetting polyether resin according to claim 1, wherein the functional group which causes a cross-linking reaction is a functional group containing an unsaturated hydrocarbon group.

3. The thermosetting polyether resin according to claim 1, wherein the functional group which causes a cross-linking reaction is selected from the group consisting of an allyl group, propargyl group and functional group represented by the formula (2):

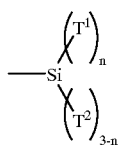

(2)

wherein, T$^1$ is selected from the group consisting of an alkenyl group having 2 to 10 carbon atoms and an alkynyl group having 2 to 10 carbon atoms; T$^2$ is selected from the group consisting of an alkyl group having 1 to 10 carbon atoms and an arylene group which may be substituted; n is an integer from 1 to 3; when a plurality of T$^1$ groups are present, they may be the same or different, and when a plurality of T$^2$ groups are present, they may be the same or different.

4. A method for producing a thermosetting polyether resin according to claim 1, wherein the method comprises the steps of metallizing a polyether resin represented by the formula (1), and substituting the metallized polyether resin with a halide compound having in the molecule a functional group which causes a cross-linking reaction.

5. A polyether resin having a low dielectric constant resin obtained by polycondensing a dihalogen compound with a bisphenol compound to obtain a polyether resin having a repeating unit represented by the formula (3), and introducing a functional group which causes a cross-linking reaction by heating into the resulted polyether resin;

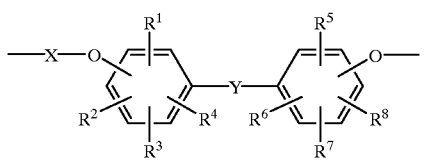

(3)

wherein each of R$^1$ to R$^8$ is independently selected from the group consisting of hydrogen atom, fluorine atom, chlorine atom, bromine atom, iodine atom, an alkyl group having 1 to 10 carbon atoms which may be substituted, a cycloalkyl group having 4 to 10 carbon atoms which may be substituted, a OR$^9$ group, and a phenyl group which may be substituted; R$^9$ is selected from the group consisting of hydrogen atom, an alkyl group having 1 to 10 carbon atoms which may be substituted, a cycloalkyl group having 4 to 10 carbon atoms which may be substituted, and a phenyl group which may be substituted; X is selected from any one or more groups described below; Y is selected from a single bond, a hydrocarbon group having 1 to 20 carbon atoms, or any one or more of —O—, —CO— and —SO$_2$—;

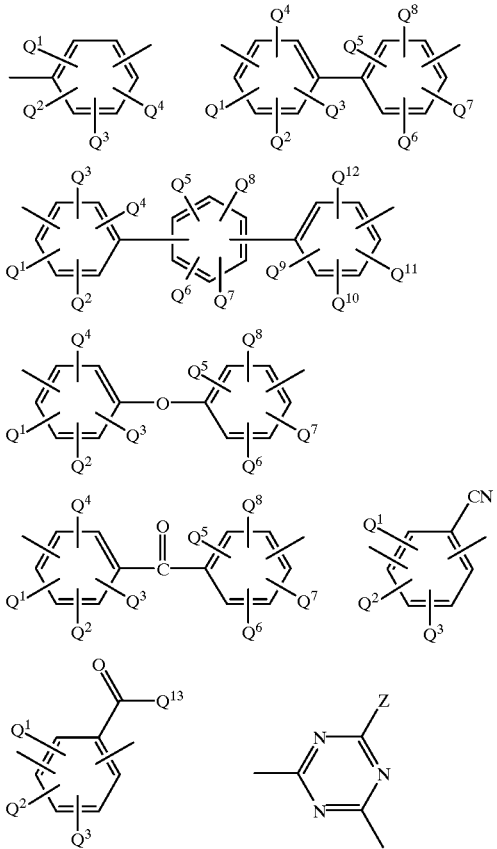

each of Q$^1$ to Q$^{12}$ is independently selected from the group consisting of an alkyl group having 1 to 10 carbon atoms which may be substituted, a cycloalkyl group having 4 to 10 carbon atoms which may be substituted, and a phenyl group which may be substituted; m represents an integer from 0 to 4; n represents an integer from 0 to 3; Z is selected from the group consisting of hydrogen atom, fluorine atom, chlorine atom, bromine atom, iodine atom, a —OZ$^1$ group, and a —N(Z$^2$)(Z$^3$) group; each of Z$^1$ to Z$^3$ independently selected from the group consisting of hydrogen atom, an alkyl group having 1 to 10 carbon atoms, an alkenyl group having 2 to 10 carbon atoms, an alkynyl group having 2 to 10 carbon atoms, and a group carrying an ether group having 1 to 10 carbon atoms, and at least one of R$^1$ to R$^8$ and Q$^1$ to Q$^{12}$ is selected from the group consisting of an alkyl group having 4 to 10 carbon atoms and a cycloalkyl group having 4 to 10 carbon atoms.

6. The polyether resin having a low dielectric constant according to claim 5, wherein at least one of R$^1$ to R$^8$ and Q$^1$ to Q$^{12}$ is selected from the group consisting of a branched alkyl group having 4 to 10 carbon atoms and a cycloalkyl group having 4 to 10 carbon atoms.

7. A coating solution for forming an insulation film comprising a thermosetting polyether resin according to claim 1.

8. A coating solution for forming an insulation film comprising a polyether resin having a low dielectric constant according to claim 5.

* * * * *